United States Patent
Hsiu

(10) Patent No.: US 9,133,977 B2
(45) Date of Patent: Sep. 15, 2015

(54) SUPPORTING MECHANISM FOR A PORTABLE ELECTRONIC DEVICE AND RELATED ROTARY ELECTRONIC SYSTEM

(71) Applicant: Wistron Corporation, New Taipei (TW)

(72) Inventor: Cheng-Min Hsiu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 412 days.

(21) Appl. No.: 13/859,755

(22) Filed: Apr. 10, 2013

(65) Prior Publication Data

US 2013/0335894 A1   Dec. 19, 2013

(30) Foreign Application Priority Data

Jun. 15, 2012   (TW) .............................. 101121538 A

(51) Int. Cl.
| | |
|---|---|
| *F16M 13/00* | (2006.01) |
| *H05K 5/00* | (2006.01) |
| *F16M 11/08* | (2006.01) |
| *G06F 1/16* | (2006.01) |

(52) U.S. Cl.
CPC .............. *F16M 13/00* (2013.01); *F16M 11/08* (2013.01); *G06F 1/1616* (2013.01); *H05K 5/0017* (2013.01); *F16M 2200/024* (2013.01); *F16M 2200/08* (2013.01)

(58) Field of Classification Search
CPC ............ F16M 13/00; F16M 2200/021; F16M 2200/025; F16M 2200/044; F16M 2200/047; F16M 11/043; F16M 11/046; F16M 11/06; F16M 11/08; F16M 11/18; G06F 1/1632; G06F 1/1616; G06F 1/1679; G06F 1/1681; H05K 5/0017; H05K 5/0221; H05K 5/023; H05K 5/0234
USPC ............. 361/679.41–679.44, 679.57–679.59; 174/542, 559–563
See application file for complete search history.

(56) References Cited

U.S. PATENT DOCUMENTS

| | | | | |
|---|---|---|---|---|
| 4,436,042 | A  * | 3/1984 | Hanyu et al. ................ | 112/217.1 |
| 7,652,873 | B2 * | 1/2010 | Lee .......................... | 361/679.06 |
| 8,061,674 | B2 * | 11/2011 | Yao .......................... | 248/346.04 |
| 2009/0031926 | A1 * | 2/2009 | Goda ............................ | 108/22 |
| 2011/0226920 | A1 * | 9/2011 | Moses ...................... | 248/346.01 |

* cited by examiner

*Primary Examiner* — Jerry Wu
*Assistant Examiner* — Christopher L Augustin
(74) *Attorney, Agent, or Firm* — Winston Hsu; Scott Margo

(57) ABSTRACT

A supporting mechanism is disclosed in the present invention. The supporting mechanism includes a base, a supporter, a latch and an actuating component. A hole and an accommodating structure are formed on a bottom of the base, and an opening of the accommodating structure faces outward of the base. The supporter is movably disposed inside the accommodating structure. The supporter includes a contacting pillar, which pierces through the hole and stretches into the base. The latch is slidably disposed inside the base. The latch includes a pushing portion for pressing the contacting pillar, so as to move the supporter out of the accommodating structure. The actuating component is pivotably disposed by a side of the base. The actuating component includes a handle and an actuating portion. The actuating portion can rotate toward an inner of the base for pushing the latch when the handle rotates outwardly.

20 Claims, 11 Drawing Sheets

SUPPORTING MECHANISM FOR A PORTABLE ELECTRONIC DEVICE AND RELATED ROTARY ELECTRONIC SYSTEM

BACKGROUND OF THE INVENTION

1. Field of the Invention

The present invention relates to a supporting mechanism for a portable electronic device and a related rotary electronic system, and more particularly, to a supporting mechanism capable of providing convenient rotating function and a related rotary electronic system, so as to adjust a view angle of the portable electronic device.

2. Description of the Prior Art

Due to a light and handy body, a conventional portable computer device, such as a notebook computer, is easy to adjust its position and a view angle according to user's demand. The user can not rotate a screen of the notebook computer toward a viewer. A main body of the notebook computer is raised and turned around to show the screen to the viewer, so the conventional operation requires strenuous effort. Therefore, design of a supporting mechanism applied to the portable computer device for stable support and easy rotation is an important issue in the computer industry.

SUMMARY OF THE INVENTION

The present invention provides a supporting mechanism capable of providing convenient rotating function and a related rotary electronic system, so as to adjust a view angle of the portable electronic device for solving above drawbacks.

According to the claimed invention, a supporting mechanism includes a base, a supporter, a latch and an actuating component. A piercing hole and an accommodating structure are formed on a bottom of the base, and the accommodating structure includes an opening. The supporter is movably disposed inside the accommodating structure, and the supporter passes through the opening to protrude from the accommodating structure. The supporter includes a contacting pillar. The contacting pillar pierces through the piercing hole to stretch into the base. The latch is slidably disposed inside the base. The latch includes a pushing portion for pressing the contacting pillar, so as to move the supporter out of the accommodating structure. The actuating component is pivotably disposed by a side of the base. The actuating component includes a handle and an actuating portion. The actuating portion is connected to the handle. The actuating portion rotates toward an inner of the base for moving the latch relative to the base when the handle rotates relative to the base outwardly.

According to the claimed invention, the supporter further includes a frame, a middle pillar and at least one sunken part. The middle pillar is disposed on a center of the frame, the sunken part is disposed on the frame and located between the middle pillar and an edge of the frame, the contacting pillar is disposed on the frame. The supporting mechanism further includes at least one ball disposed between the supporter and the base. The ball is partly disposed inside the sunken part and partly contacts the base.

According to the claimed invention, the frame is a disk structure, the middle pillar is disposed on an axle center of the disk structure, and the sunken part is disposed between the middle pillar and an arc edge of the disk structure.

According to the claimed invention, the latch further includes a body. At least one cleaving hole is formed on a surface of the body, and the pushing portion is disposed on the body. At least one aperture is further formed on the bottom of the base. The at least one ball inserts into the cleaving hole and the aperture when the cleaving hole aligns with the aperture, so as to be accommodated between the at least one sunken part and the inner of the base.

According to the claimed invention, a radial dimension of the aperture is substantially smaller than a radial dimension of the ball.

According to the claimed invention, an interference between the ball, the cleaving hole and the aperture constrains a rotation of the supporter relative to the base when the ball inserts into the cleaving hole and the aperture.

According to the claimed invention, the body presses the ball when the cleaving hole does not align with the aperture, so the ball is separated from the cleaving hole to be out of the inner of the base.

According to the claimed invention, the supporting mechanism further includes a first spring disposed on the middle pillar. Two ends of the first spring respectively contact against a surface of the frame and the bottom of the base.

According to the claimed invention, the supporting mechanism further includes a second spring. Two ends of the second spring are respectively connected to the base and the latch.

According to the claimed invention, the supporting mechanism further includes a locking component movably disposed on the base. The locking component contacts against the actuating component, so as to constrain a pivot of the actuating component relative to the base with a block of the base.

According to the claimed invention, the locking component includes a main portion and a resilient portion. An end of the main portion blocks the actuating component. The resilient portion is disposed on a side of the main portion. The resilient portion contacts against a wall of the base to constrain a movement of the main portion relative to the base.

According to the claimed invention, the locking component further includes a first engaging structure disposed on the resilient portion. The base further includes a second engaging structure. The first engaging structure is engaged with the second engaging structure to constrain a movement of the locking component relative to the base.

According to the claimed invention, the supporting mechanism further includes a resilient component. Two ends of the resilient component are respectively connected to the locking component and the base.

According to the claimed invention, a rotary electronic system includes a portable electronic device and a supporting mechanism. The portable electronic device includes a low casing for holding at least one electronic component. The supporting mechanism is disposed under the portable electronic device. The supporting mechanism includes a base, a supporter, a latch and an actuating component. The base is connected to the low casing of the portable electronic device. A piercing hole and an accommodating structure are formed on a bottom of the base, and the accommodating structure includes an opening. The supporter is movably disposed inside the accommodating structure, and the supporter passes through the opening to protrude from the accommodating structure. The supporter includes a contacting pillar. The contacting pillar pierces through the piercing hole to stretch into the base. The latch is slidably disposed inside the base. The latch includes a pushing portion for pressing the contacting pillar, so as to move the supporter out of the accommodating structure. The actuating component is pivotably disposed by a side of the base. The actuating component includes a handle and an actuating portion. The actuating portion is connected to the handle. The actuating portion rotates toward an inner of the base for moving the latch relative to the base when the handle rotates relative to the base outwardly.

According to the claimed invention, the supporting mechanism further includes a cover disposed on the base. The cover is integrated with the low casing monolithically, or the cover and the low casing are two separated units.

The supporting mechanism and the related rotary electronic system of the present invention have advantages of simple structure and easy operation. The supporting mechanism can be utilized to smoothly adjust the view angle of the rotary electronic system. The supporting mechanism of the present invention can be an external docking, which is applied to the portable electronic device with any dimensions and weight. The supporting mechanism of the present invention can further be disposed inside the portable electronic device in a built-in manner. Components of the supporting mechanism can be made of polymeric material or metal material, so that the rotary electronic system can conform to a trend of the thin and slight design for preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
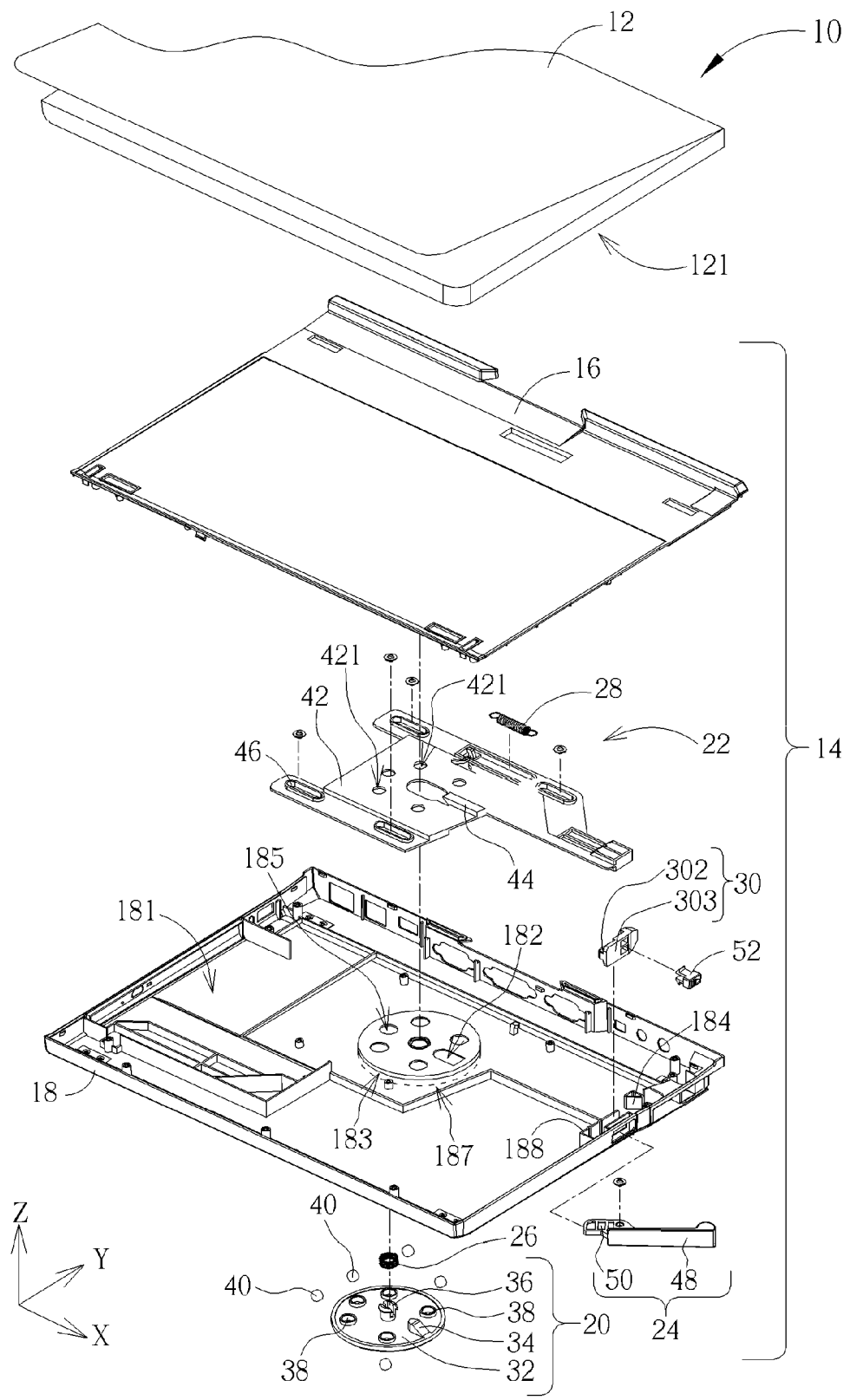
FIG. 1 is an exploded diagram of a rotary electronic system according to an embodiment of the present invention.
Figure 2:
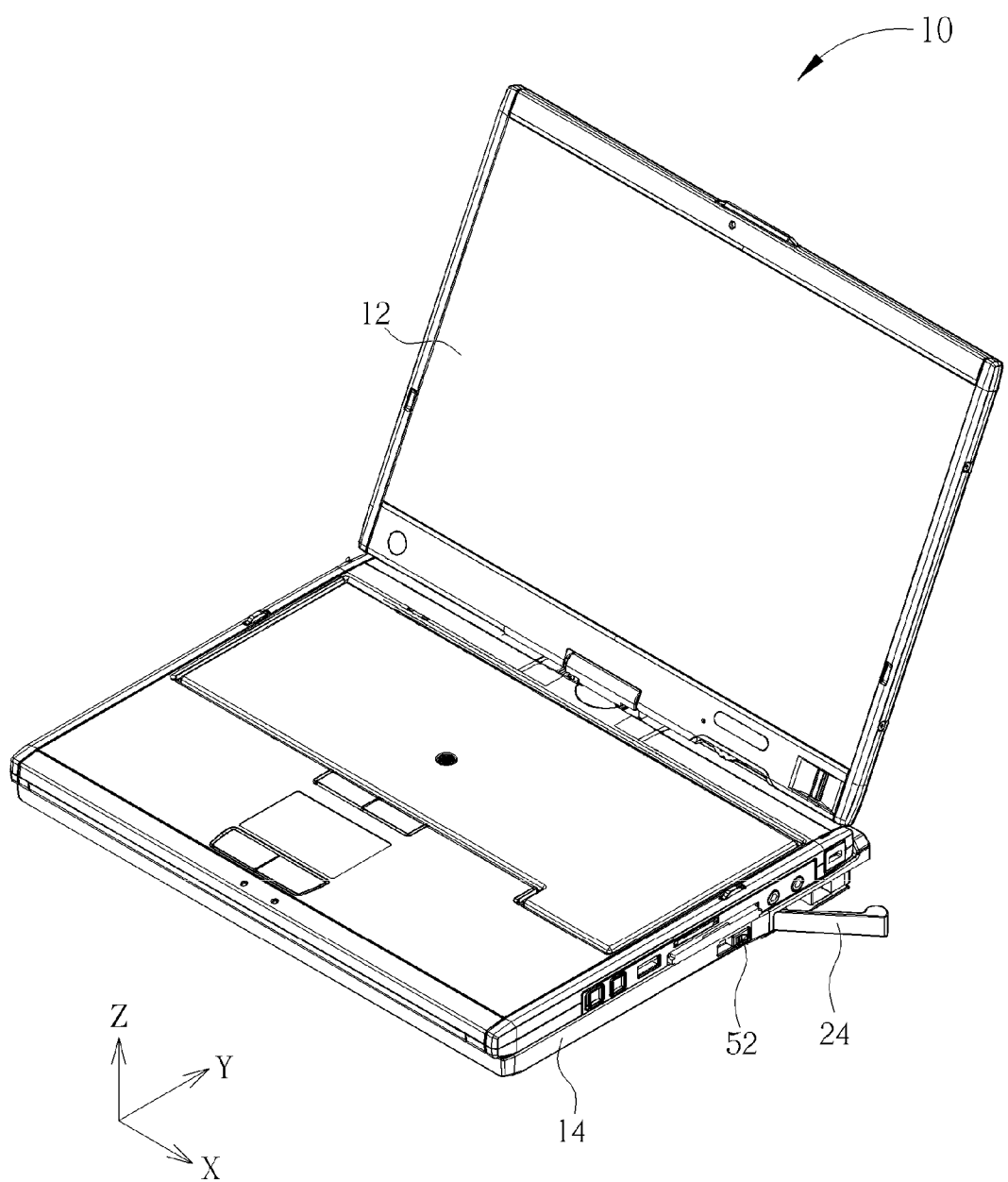
FIG. 2 is an assembly diagram of the rotary electronic system according to the embodiment of the present invention.

Please refer to FIG. 1 and FIG. 2. FIG. 1 is an exploded diagram of a rotary electronic system 10 according to an embodiment of the present invention. FIG. 2 is an assembly diagram of the rotary electronic system 10 according to the embodiment of the present invention. The rotary electronic system 10 includes a portable electronic device 12 and a supporting mechanism 14. The portable electronic device 12 can be a notebook computer, and the supporting mechanism 14 can be disposed under the portable electronic device 12. When the rotary electronic system 10 is put on a plane, such as a desk, a position height of the portable electronic device 12 can be increased via the supporting mechanism 14, and the portable electronic device 12 can further be rotated relative to the plane by the supporting mechanism 14. Generally, the supporting mechanism 14 can be a separated unit to be detachably connected to the portable electronic device 12. The supporting mechanism 14 can further be directly disposed on a bottom of the portable electronic device 12 to form an integrated structure.

As shown in FIG. 1 and FIG. 2, the supporting mechanism 14 includes a cover 16, a base 18, a supporter 20, a latch 22, an actuating component 24, a first spring 26, a second spring 28 and a locking component 30. The base 18 is connected to a low casing 121 of the portable electronic device 12. The low casing 121 can hold a plurality of inner electronic components of the portable electronic device 12, such as a hard disk, a processor, a memory module and so on. A piercing hole 182 and an accommodating structure 183 can be formed on a bottom 181 of the base 18. The accommodating structure 183 has an opening 187, and the opening 187 can point at an outer of the base 18. The opening 187 is shown by a dotted line in FIG. 1. The supporter 20 can pass through the opening 187 to be out of the accommodating structure 183 for protruding from the bottom 181 of the base 18. A dimension of the supporter 20 can be substantially equal to a dimension of the accommodating structure 183, and the supporter 20 can be movably disposed inside the accommodating structure 183. The latch 22 can be slidably disposed inside the base 18. The actuating component 24 can be pivotably disposed by a side of the base 18. The actuating component 24 can be forced along X-Y plane to slide the latch 22 relative to the base 18 along X-axis, and the supporter 20 can be pushed to protrude from the accommodating structure 183 along Z-axis.

In addition, the locking component 30 can be movably disposed on the base 18. The locking component 30 can slide relative to the base 18 for buckling two ends of the actuating component 24 with a block 184 of the base, so as to constrain a pivot of the actuating component 24 relative to the base 18. The locking component 30 can include a main portion 302 and a resilient portion 303. An end (top end) of the main portion 302 can block or contact against the actuating component 24 for constraining a rotation of the actuating component 24. The resilient portion 303 can be disposed on a side of the main portion 302. The resilient portion 303 can contact against a wall 188 of the base 18, so as to utilize friction to constrain a movement of the main portion 302 relative to the base 18. The cover 16 can be disposed on the base 18 for covering the supporter 20, the latch 22, the actuating component 24, the first spring 26, the second spring 28 and the locking component 30. The cover 16 can be integrated with the low casing 121 monolithically, which means the supporting mechanism 14 is directly set inside the portable electronic device 12. The cover 16 and the low casing 121 can further be the separated units, so that the supporting mechanism 14 can be connected to the portable electronic device 12 in a detachable manner according to the user's demand.

The supporter 20 includes a frame 32, a contacting pillar 34, a middle pillar 36 and a plurality of sunken parts 38. The middle pillar 36 is disposed on a center of the frame 32, so the frame 32 can rotate on the middle pillar 36. The plurality of sunken parts 38 can be disposed around the middle pillar 36 and by an edge of the frame 32 in an annular manner. The contacting pillar 34 can be disposed on any position of the frame 32 for passing through the piercing hole 182 to stretch into the base 18. Generally, the frame 32 can be a disk structure. The middle pillar 36 can be disposed on an axle center of the disk structure, the plurality of sunken parts 38 can be set around the axle center and uniformly between the middle pillar 36 and an arc edge of the disk structure in the annular manner. The arc edge is a boundary of the disk structure, and the plurality of sunken parts 38 can be set around the middle pillar 36 along the arc edge, so as to form a concentric circle which is smaller than the disk structure. The supporting mechanism 14 can further include a plurality of balls 40 respectively disposed between the supporter 20 and the base 18. An amount of the balls 40 corresponds to an amount of the sunken parts 38. Each ball 40 can be partly accommodated inside the corresponding sunken part 38, and further partly contact the base 18 or the latch 22 after the supporting mechanism 14 is assembled.

The latch 22 includes a body 42, a pushing portion 44 and a slide slot 46. The body 42 can be movably disposed on the bottom 181 of the base 18 via the slide slot 46. A plurality of cleaving holes 421 can be formed on a surface of the body 42. The pushing portion 44 can be disposed on the body 42 for pushing the contacting pillar 34, so as to move the supporter 20 relative to the base 18. A plurality of apertures 185 can be formed on the bottom 181 of the base 18. Amounts of the apertures 185 and the cleaving holes 421 correspond to an amount of the balls 40. A radial dimension of the cleaving hole 421 (or the aperture 185) can be substantially smaller than a radial dimension of the ball 40, to ensure that the ball 40 can stably align with the cleaving hole 421 and the aperture 185 without separation. When the cleaving hole 421 aligns with the aperture 185, the ball 40 can insert into the cleaving hole 421 and the aperture 185 to be accommodated between the sunken part 38 and the base 18. It is to say, a part of each ball 40 can be accommodated inside the sunken part 38, and the other part of each ball 40 can be accommodated inside the base 18.

It should be mentioned that the ball 40 can insert into the cleaving hole 421 and the aperture 185 to be partly accommodated inside the base 18 when the cleaving hole 421 aligns with the aperture 185, so that an interference between the ball 40, the latch 22 and the base 18 is generated to constrain the rotation of the supporter 20 relative to the base 18. As the latch 22 slides relative to the base 18 and the cleaving hole 421 misses the aperture 185, the body 42 of the latch 22 can press the ball 40 to be out of the cleaving hole 421, so that the ball 40 can be partly separated from the aperture 185 to move relative to the base 18 outwardly.

The actuating component 24 includes a handle 48 and an actuating portion 50 respectively located at two opposite ends of the actuating component 24. The actuating portion 50 can rotate relative to the base 18 inwardly when the handle 48 is reversed relative to the base 18, so as to slide the latch 22 relative to the base 18 toward a position that the latch 22 pushes the supporter 20 out of the accommodating structure 183. Besides, the first spring 26 can be disposed on the middle pillar 36 of the supporter 20, and two ends of the first spring 26 can respectively contact against a surface of the frame 32 and the bottom 181 of the base 18. As a force applied to the handle 48 is removed, a resilient recovering force stored by the first spring 26 can move the supporter 20 into the accommodating structure 183 in an automatic storage manner. Two ends of the second spring 28 can be respectively connected to the base 18 and the latch 22. As the force applied to the handle 48 is removed, a resilient recovering force stored by the second spring 28 can reversely slide the latch 22 relative to the base 18 for coming back to an initial position. The first spring 26 can be a compression spring, and the second spring 28 can be a tension spring, preferably.

Figure 3:
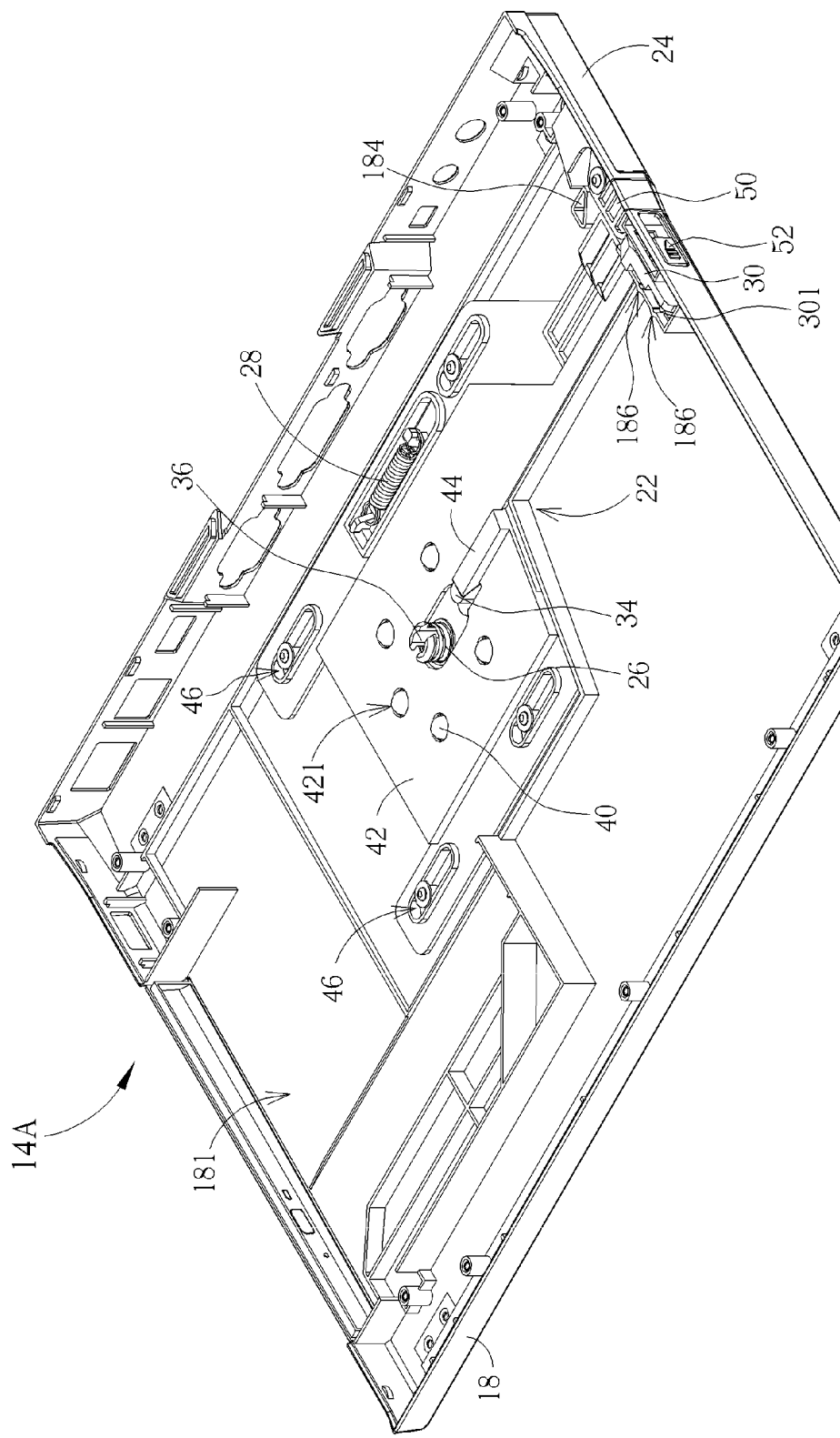
FIG. 3 is an assembly diagram of a supporting mechanism according to a first embodiment of the present invention.
Figure 4:
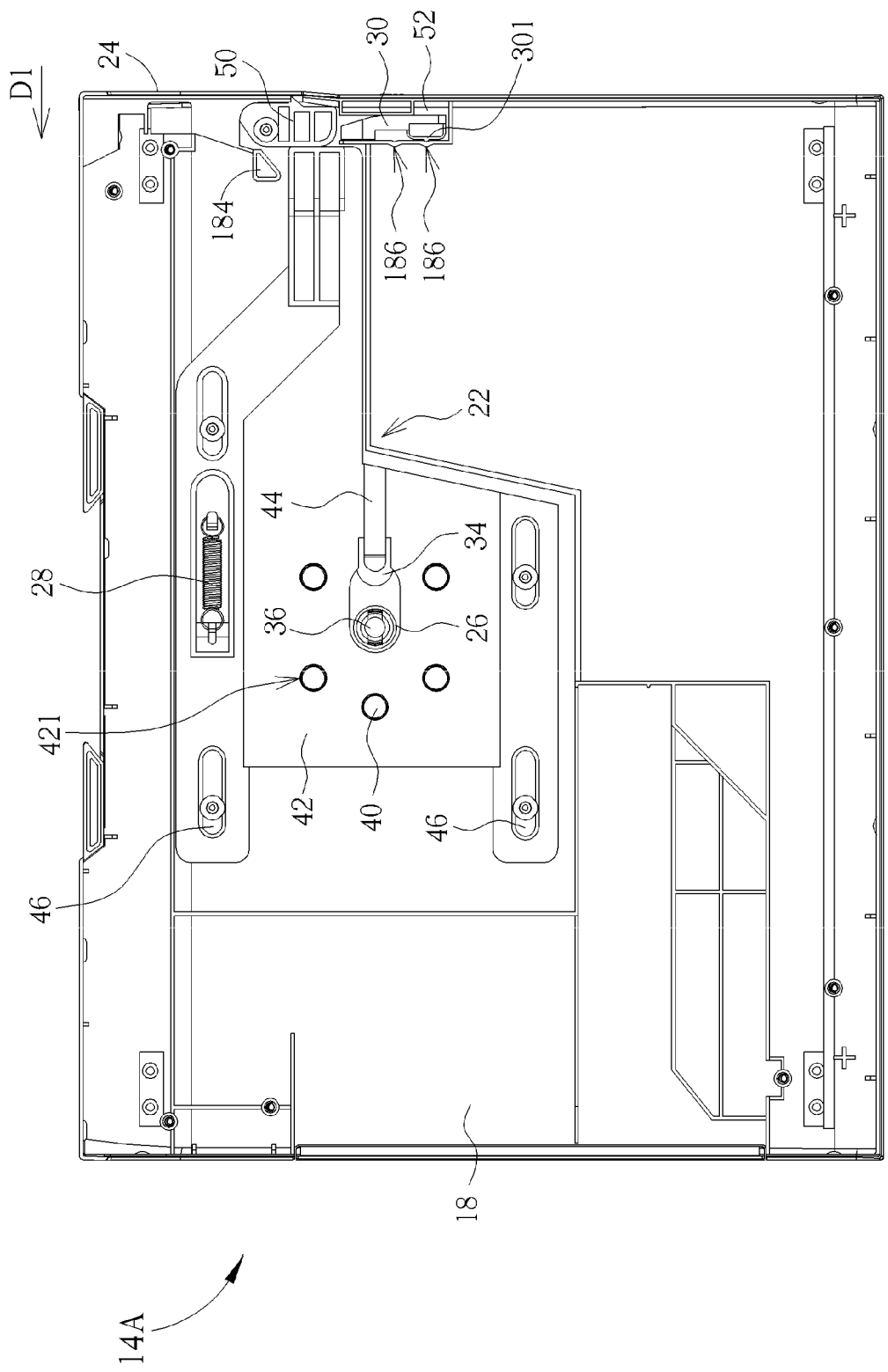
FIG. 4 to FIG. 6 respectively are diagrams of the supporting mechanism in different modes according to the first embodiment of the present invention.
Figure 5:
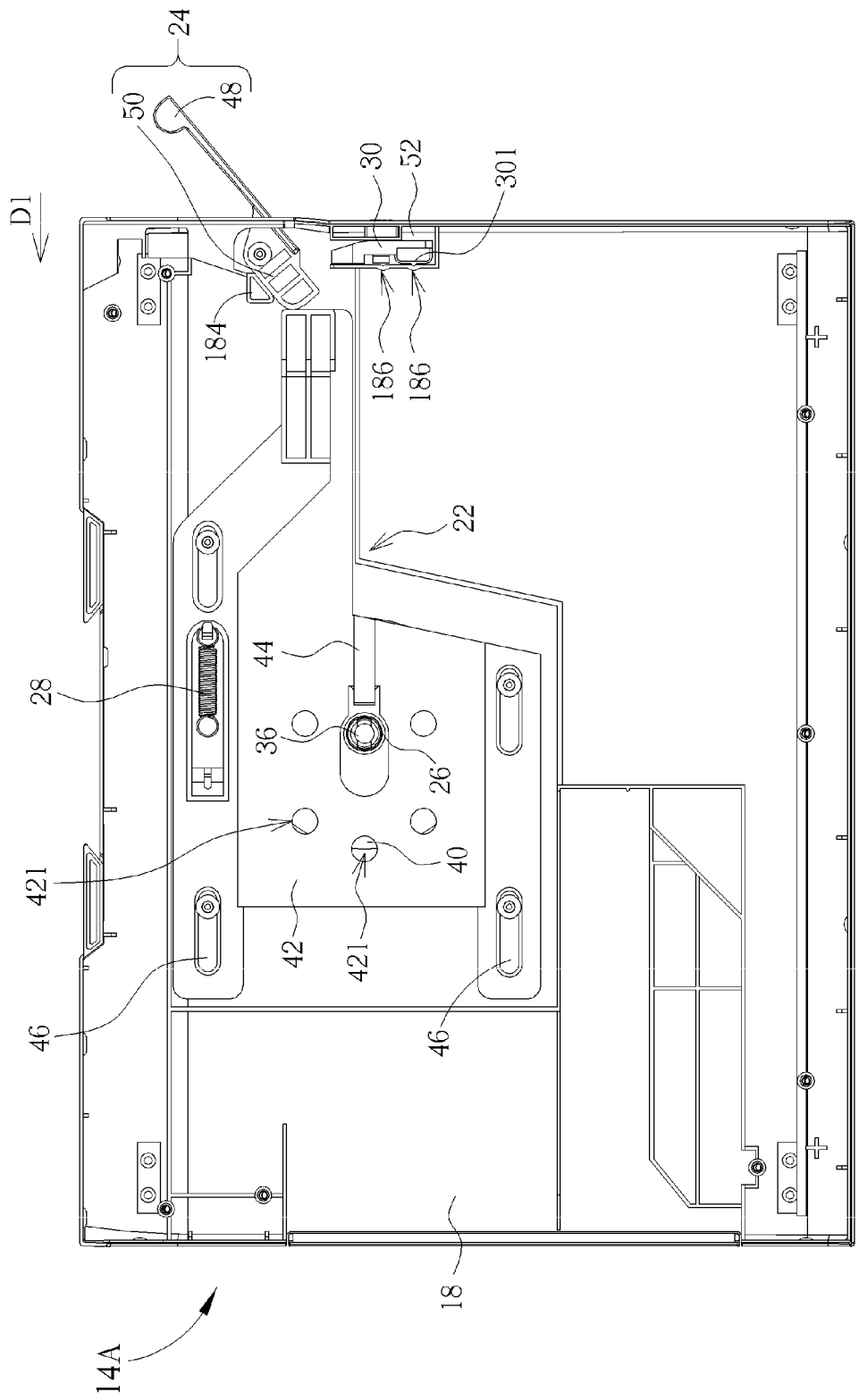
Figure 6:
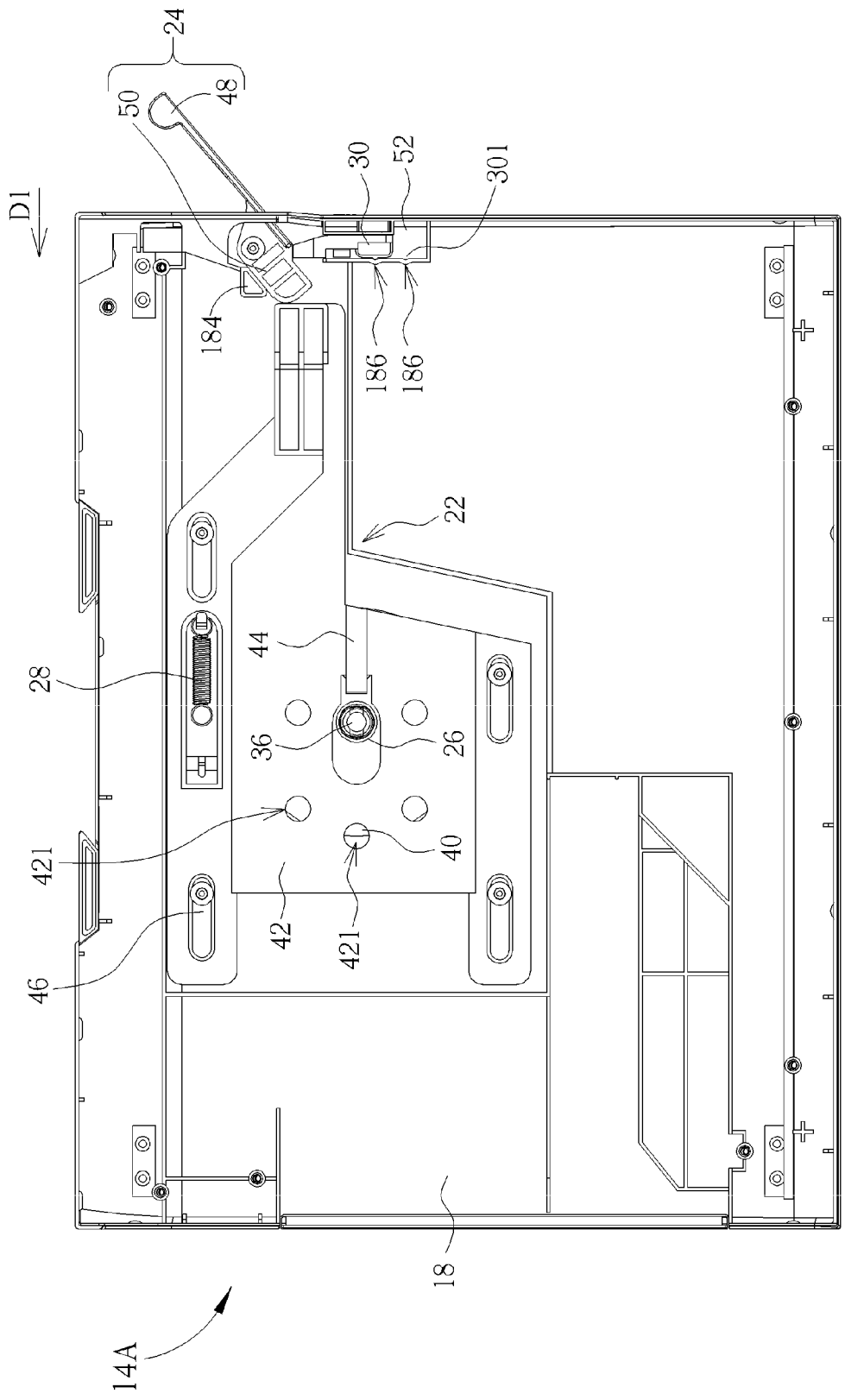

Please refer to FIG. 3 to FIG. 6. FIG. 3 is an assembly diagram of the supporting mechanism 14A according to a first embodiment of the present invention. FIG. 4 to FIG. 6 respectively are diagrams of the supporting mechanism 14A in different modes according to the first embodiment of the present invention. As shown in FIG. 3, the supporting mechanism 14A can further include a button 52 disposed on a side panel of the base 18 and connected to the locking component 30. The locking component 30 can include a first engaging structure 301 disposed on the resilient portion 303. The base 18 can further include at least one second engaging structure 186 disposed on an inside panel of the base 18. The first engaging structure 301 can be a protrusion with a resilient arm, and the second engaging structure 186 can be a sunken portion corresponding to the protrusion. The first engaging structure 301 can be engaged with the second engaging structure 186, so as to constrain the movement of the locking component 30 relative to the base 18.

As shown in FIG. 1 and FIG. 4, the supporting mechanism 14A is at an initial mode. The supporter 20 is under the base 18, and movably disposed inside the accommodating structure 183 of the base 18. The accommodating structure 183 and the supporter 20 are disposed on a back of the base 18 (a surface opposite to the bottom 181), and are not shown in FIG. 4. Each cleaving hole 421 can align with the corresponding aperture 185, so that each ball 40 can insert into the cleaving hole 421 and the aperture 185 for the interference. The supporter 20 can not rotate relative to the base 18 by the interference between the balls 40, the latch 22 and the base 18. As shown in FIG. 5, the handle 48 can rotate relative to the base 18 outwardly for starting a rotary function of the supporting mechanism 14A. In the meantime, the actuating portion 50 can move into the base 18 for pressing the latch 22. The latch 22 moves relative to the base 18 along a first direction D1, and the pushing portion 44 can press the contacting pillar 34, so as to push the supporter 20 out of the accommodating structure 183. Furthermore, each cleaving hole 421 does not align with the corresponding aperture 185 because the latch 22 slides relative to the base 18. The body 42 of the latch 22 can move above the aperture 185 for separating the balls 40 from the corresponding apertures 185, so as to release the interference between the balls 40, the latch 22 and the base 18.

Because the first spring 26 and the second spring 28 can store the resilient recovering force by compression and tension, as shown in FIG. 5, the supporter 20 and the latch 22 can move back to the initial position by the first spring 26 and the second spring 28 when the force applied to the handle 48 is removed. For preventing the above-mentioned situation, the button 52 can be utilized to lock the actuating component 24 via the locking component 30. As shown in FIG. 6, the locking component 30 and the block 184 can respectively contact two ends of the actuating portion 50, to effectively constrain the pivot of the actuating component 24 relative to the base 18. The first engaging structure 301 can be engaged with the corresponding second engaging structure 186 for preventing the movement of the locking component 30 relative to the base 18, so as to provide a stable constraint on the actuating component 24. In the meanwhile, the supporter 20 can protrude from the accommodating structure 183 to pole the supporting mechanism 14A and to clear friction between the supporting mechanism 14A and the plane (such as the desk). Thus, the base 18 can rotate relative to the supporter 20 on the middle pillar 36, which means the portable electronic device 12 can conveniently rotate relative to the plane (the desk) via the supporting mechanism 14A.

Figure 7:
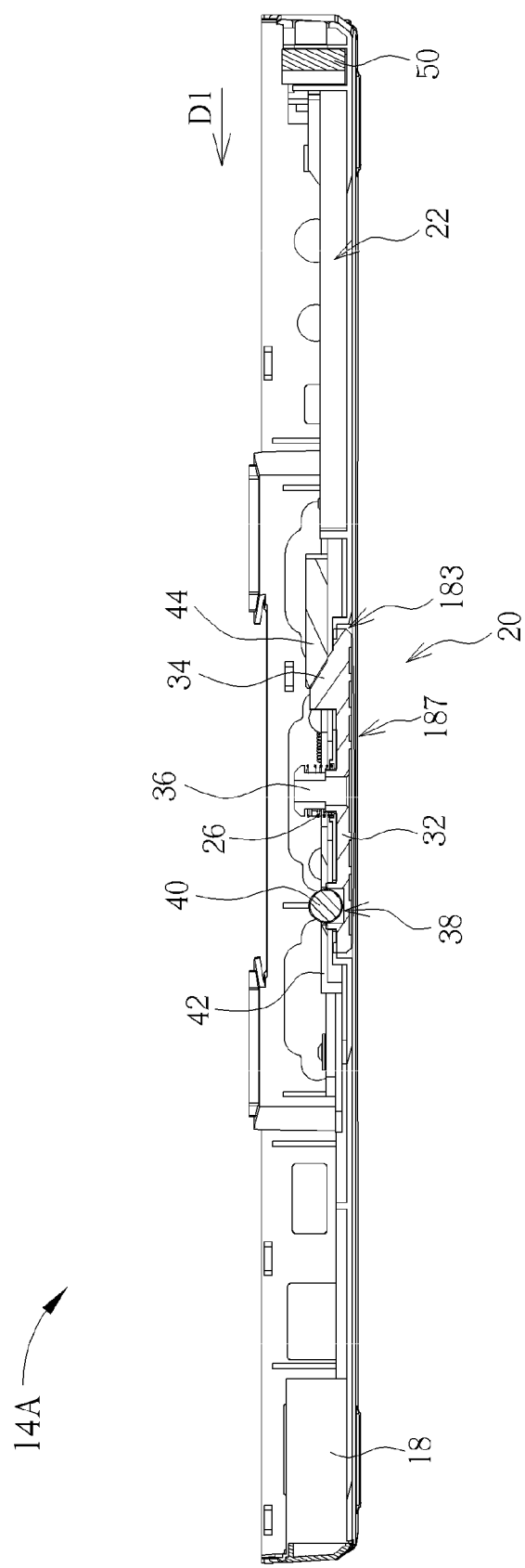
FIG. 7 and FIG. 8 respectively are sectional views of the structure shown in FIG. 4 and FIG. 5.
Figure 8:
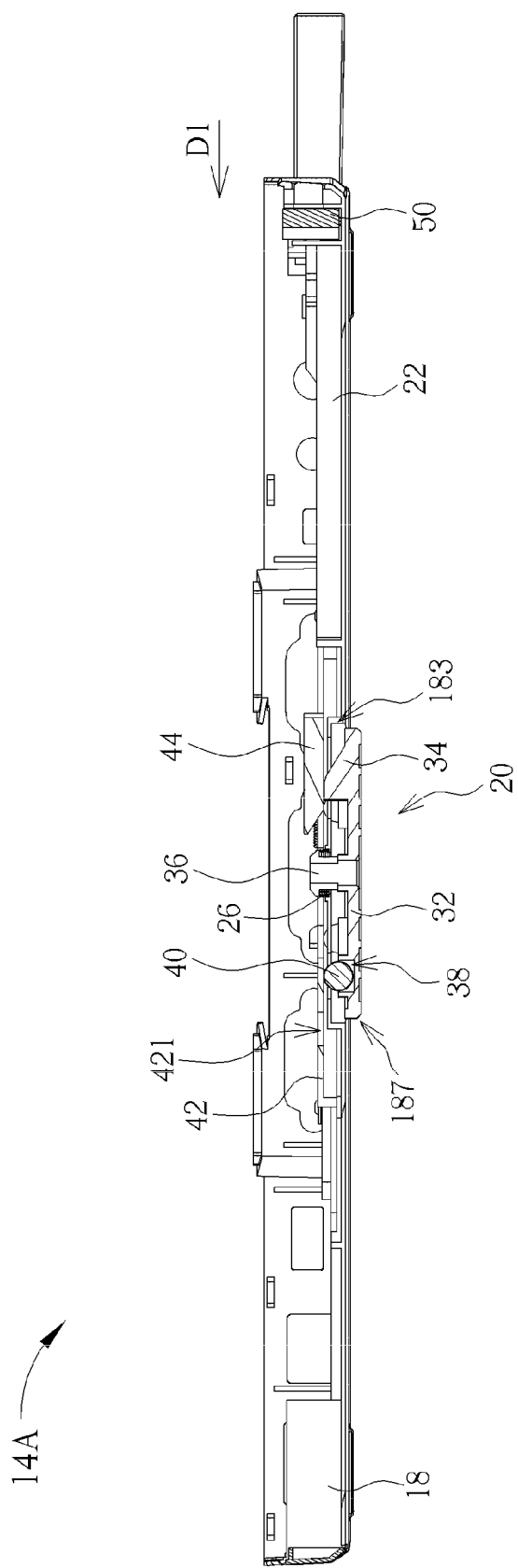

Please refer to FIG. 7 and FIG. 8. FIG. 7 and FIG. 8 respectively are sectional views of the structure shown in FIG. 4 and FIG. 5. As shown in FIG. 4 and FIG. 7, the supporting mechanism 14A is at the initial mode, the pushing portion 44 does not press the contacting pillar 34, each cleaving hole 421 can align with the corresponding aperture 185, and the ball 40 can insert into the cleaving hole 421 and the aperture 185 to be partly accommodated inside the base 18. At the time, the supporter 20 is located inside the accommodating structure 183, and the supporter 20 can not rotate relative to the base 18 by the interference between the ball 40, the latch 22 and the base 18. As shown in FIG. 5 and FIG. 8, the actuating component 24 slides the latch 22 relative to the base 18 along the first direction D1, the pushing portion 44 can press the contacting pillar 34 downwardly, and the supporter 20 can protrude from the accommodating structure 183. As the movement of the latch 22, the cleaving hole 421 does not align with the aperture 185, the ball 40 can be separated from the base 18 by the body 42 and the interference is released, so that the base 18 can rotate relative to the supporter 20 to conveniently adjust the view angle of the portable electronic device 12.

Figure 9:
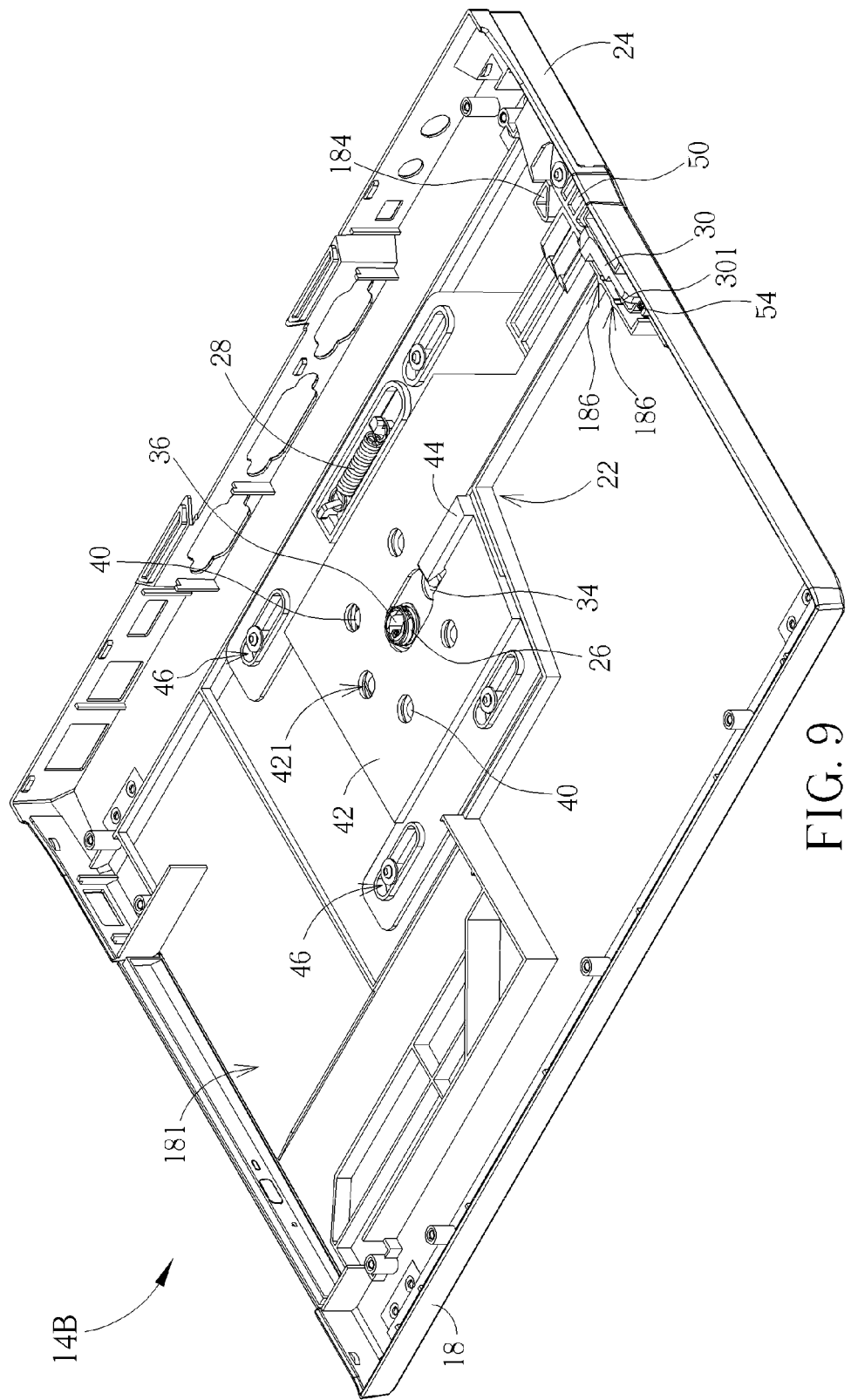
FIG. 9 is an assembly diagram of a supporting mechanism according to a second embodiment of the present invention.
Figure 10:
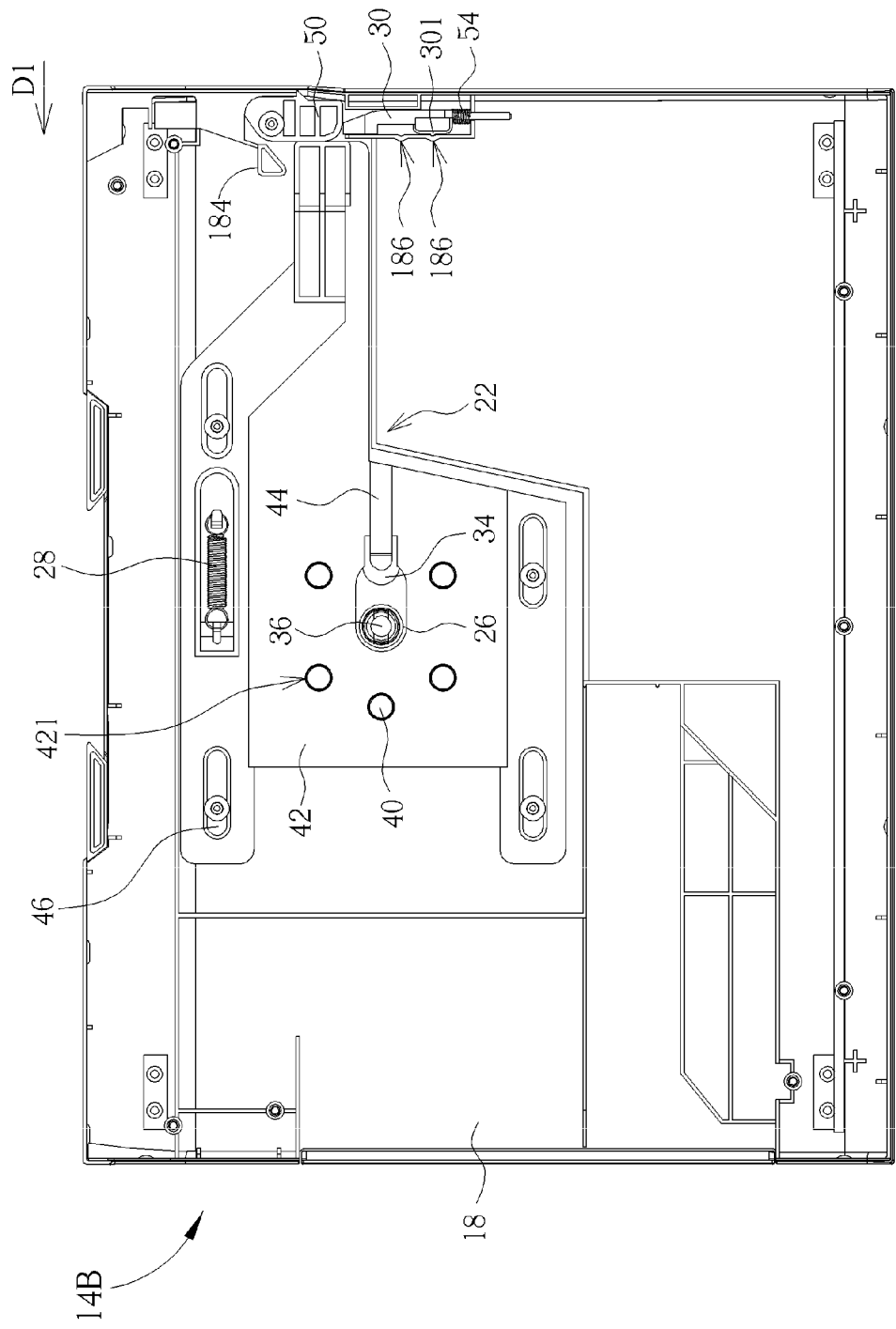
FIG. 10 and FIG. 11 respectively are diagrams of the supporting mechanism in different modes according to the second embodiment of the present invention.
Figure 11:
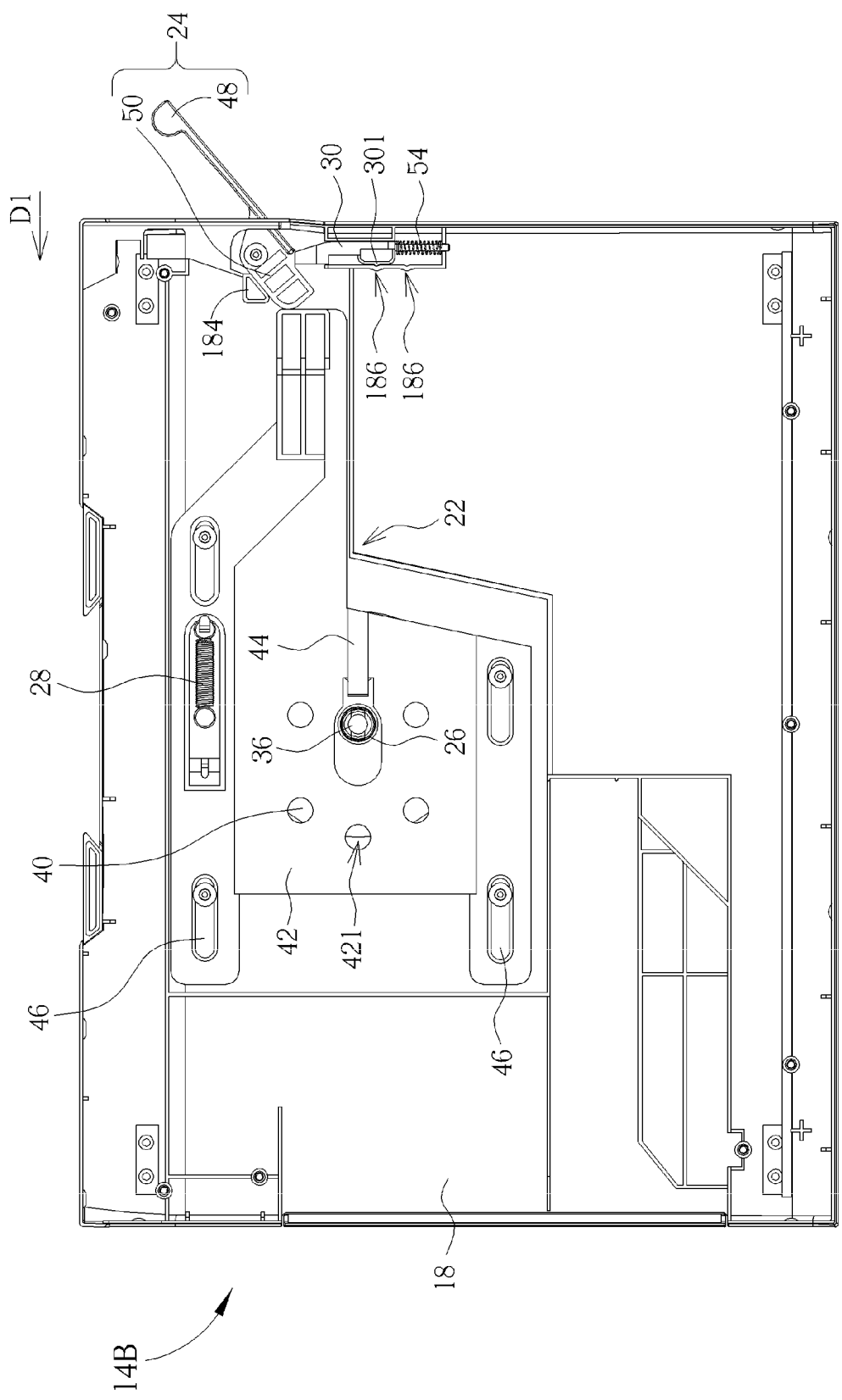

Please refer to FIG. 9 to FIG. 11. FIG. 9 is an assembly diagram of the supporting mechanism 14B according to a second embodiment of the present invention. FIG. 10 and FIG. 11 respectively are diagrams of the supporting mechanism 14B in different modes according to the second embodiment of the present invention. In the second embodiment, elements having the same numeral as ones of the first embodiment have the same structure and function, and detailed description is omitted herein for simplicity. Difference between the second embodiment and the first embodiment is that the supporting mechanism 14B can include a resilient component 54 instead of the button. As shown in FIG. 9, two ends of the resilient component 54 can be respectively connected to the locking component 30 and the base 18. The supporting mechanism 14B of the second embodiment does not utilize the external force to execute the constraint of the locking component 30, but utilizes a resilient recovering force of the resilient component 54 to achieve automatic execution.

As shown in FIG. 10, the locking component 30 can compress the resilient component 54 to be installed inside the base 18 when the actuating component 24 is at a closing mode. In the meantime, the pushing portion 44 does not press the contacting pillar 34, each cleaving hole 421 can align with the corresponding aperture 185, and the supporter 20 can be accommodated inside the accommodating structure 183. As shown in FIG. 11, the actuating portion 50 can slide the latch 22 relative to the base 18 along the first direction D1 when the actuating component 24 rotates relative to the base 18 outwardly. The resilient recovering force of the resilient component 54 can push the locking component 30 and the block 184 to respectively contact against two ends of the actuating portion 50, so as to steady a rotation angle of the actuating component 24. As the above-mentioned first embodiment, the latch 22 moves along the first direction D1 can utilize the pushing portion 44 and the body 42 to respectively press the contacting pillar 34 and the ball 40. The latch 22 not only can push the supporter 20 out of the accommodating structure 183, but also can simultaneously release the constraint of the base 18 relative to the supporter 20, so that the view angle of the portable electronic device 12 can be adjusted conveniently and rapidly by the supporting mechanism 14B.

In conclusion, the present invention utilizes the actuating component, the latch and the supporter to form a link mechanism. The actuating component can be pulled open along X-Y plane to move the latch along X-axis, and a combination of the pushing portion and the contacting pillar can push the supporter out of the accommodating structure along Z-axis, so as to release the interference between the ball, the latch and the base. Further, the locking component can fix the actuating component with the block, to prevent the actuating component from back to the initial mode due to the resilient recovering force. The resilient recovering force are transmitted through the supporter and the latch, and respectively generated by the first spring and the second spring. As the supporter protrudes from the accommodating structure by the latch, the supporting mechanism can have advantages of low contacting area and great slide fluency due to a point-to-point manner between the ball and the body of the latch, and the base can rotate relative to the supporter easily. Therefore, the portable electronic device can be put or installed on the supporting mechanism of the present invention, and the user can adjust the view angle of the portable electronic device over 360 degrees via the supporting mechanism in a horizontal movement.

Comparing to the prior art, the supporting mechanism and the related rotary electronic system of the present invention have advantages of simple structure and easy operation. The supporting mechanism can be utilized to smoothly adjust the view angle of the rotary electronic system. The supporting mechanism of the present invention can be an external docking, which is applied to the portable electronic device with any dimensions and weight. The supporting mechanism of the present invention can further be disposed inside the portable electronic device in a built-in manner. Components of the supporting mechanism can be made of polymeric material or metal material, so that the rotary electronic system can conform to a trend of the thin and slight design for preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting mechanism comprising:
a base connected to a low casing of a portable electronic device, a piercing hole and an accommodating structure being formed on a bottom of the base, and the accommodating structure comprising an opening;
a supporter movably disposed inside the accommodating structure, the supporter passing through the opening to protrude from the accommodating structure, the supporter comprising:
a contacting pillar, the contacting pillar piercing through the piercing hole to stretch into the base;
a latch slidably disposed inside the base, the latch comprising:
a pushing portion for pressing the contacting pillar so as to move the supporter out of the accommodating structure; and
an actuating component pivotably disposed by a side of the base, the actuating component comprises:
a handle; and
an actuating portion connected to the handle, the actuating portion rotating toward an inner of the base for moving the latch relative to the base when the handle rotates relative to the base outwardly.

2. The supporting mechanism of claim 1, wherein the supporter further comprises a frame, a middle pillar and at least one sunken part, the middle pillar is disposed on a center of the frame, the sunken part is disposed on the frame and located between the middle pillar and an edge of the frame, the contacting pillar is disposed on the frame, the supporting mechanism further comprises at least one ball disposed between the supporter and the base, the ball is partly disposed inside the sunken part and partly contacts the base.

3. The supporting mechanism of claim 2, wherein the frame is a disk structure, the middle pillar is disposed on an axle center of the disk structure, and the sunken part is disposed between the middle pillar and an arc edge of the disk structure.

4. The supporting mechanism of claim 2, wherein the latch further comprises a body, at least one cleaving hole is formed on a surface of the body, the pushing portion is disposed on the body, at least one aperture is further formed on the bottom of the base, the at least one ball inserts into the cleaving hole and the aperture when the cleaving hole aligns with the aperture, so as to be accommodated between the at least one sunken part and the inner of the base.

5. The supporting mechanism of claim 4, wherein a radial dimension of the aperture is substantially smaller than a radial dimension of the ball.

6. The supporting mechanism of claim 4, wherein an interference between the ball, the cleaving hole and the aperture constrains a rotation of the supporter relative to the base when the ball inserts into the cleaving hole and the aperture.

7. The supporting mechanism of claim 4, wherein the body presses the ball when the cleaving hole does not align with the aperture, so the ball is separated from the cleaving hole to be out of the inner of the base.

8. The supporting mechanism of claim 2, further comprising:
   a first spring disposed on the middle pillar, two ends of the first spring respectively contacting against a surface of the frame and the bottom of the base.

9. The supporting mechanism of claim 8, further comprising:
   a second spring, two ends of the second spring being respectively connected to the base and the latch.

10. The supporting mechanism of claim 1, further comprising:
    a locking component movably disposed on the base, the locking component contacting against the actuating component so as to constrain a pivot of the actuating component relative to the base with a block of the base.

11. The supporting mechanism of claim 10, wherein the locking component comprises:
    a main portion, an end of the main portion blocking the actuating component; and
    a resilient portion disposed on a side of the main portion, the resilient portion contacting against a wall of the base to constrain a movement of the main portion relative to the base.

12. The supporting mechanism of claim 11, wherein the locking component further comprises a first engaging structure disposed on the resilient portion, the base further comprises a second engaging structure, the first engaging structure is engaged with the second engaging structure to constrain a movement of the locking component relative to the base.

13. The supporting mechanism of claim 10, further comprising:
    a resilient component, two ends of the resilient component being respectively connected to the locking component and the base.

14. A rotary electronic system comprising:
    a portable electronic device, the portable electronic device comprising a low casing for holding at least one electronic component; and
    a supporting mechanism disposed under the portable electronic device, the supporting mechanism comprising:
        a base connected to the low casing of the portable electronic device, a piercing hole and an accommodating structure being formed on a bottom of the base, and the accommodating structure comprising an opening;
        a supporter movably disposed inside the accommodating structure, the supporter passing through the opening to protrude from the accommodating structure, the supporter comprising:
            a contacting pillar, the contacting pillar piercing through the piercing hole to stretch into the base;
        a latch slidably disposed inside the base, the latch comprising:
            a pushing portion for pressing the contacting pillar so as to move the supporter out of the accommodating structure; and
        an actuating component pivotably disposed by a side of the base, the actuating component comprises:
            a handle; and
            an actuating portion connected to the handle, the actuating portion rotating toward an inner of the base for moving the latch relative to the base when the handle rotates relative to the base outwardly.

15. The rotary electronic system of claim 14, wherein the supporter further comprises a frame, a middle pillar and at least one sunken part, the middle pillar is disposed on a center of the frame, the sunken part is disposed on the frame and located between the middle pillar and an edge of the frame, the contacting pillar is disposed on the frame, the supporting mechanism further comprises at least one ball disposed between the supporter and the base, the ball is partly disposed inside the sunken part and partly contacts the base.

16. The rotary electronic system of claim 15, wherein the latch further comprises a body, at least one cleaving hole is formed on a surface of the body, the pushing portion is disposed on the body, at least one aperture is further formed on the bottom of the base, a radial dimension of the aperture is substantially smaller than a radial dimension of the ball, the at least one ball inserts into the cleaving hole and the aperture when the cleaving hole aligns with the aperture, so as to be accommodated between the at least one sunken part and the inner of the base.

17. The rotary electronic system of claim 15, wherein the supporting mechanism further comprises:
    a first spring disposed on the middle pillar, two ends of the first spring respectively contacting against a surface of the frame and the bottom of the base; and
    a second spring, two ends of the second spring being respectively connected to the base and the latch.

18. The rotary electronic system of claim 14, wherein the supporting mechanism further comprises:
    a locking component movably disposed on the base, the locking component contacting against the actuating component so as to constrain a pivot of the actuating component relative to the base with a block of the base.

19. The rotary electronic system of claim 18, wherein the locking component further comprises a first engaging structure, the base further comprises a second engaging structure, the first engaging structure is engaged with the second engaging structure to constrain a movement of the locking component relative to the base.

20. The rotary electronic system of claim 14, wherein the supporting mechanism further comprises:
    a cover disposed on the base, the cover being integrated with the low casing monolithically, or the cover and the low casing being two separated units.

* * * * *